United States Patent
Taira et al.

(10) Patent No.: US 7,406,055 B2
(45) Date of Patent: Jul. 29, 2008

(54) RADIO COMMUNICATION APPARATUS, TRANSMITTER APPARATUS, RECEIVER APPARATUS AND RADIO COMMUNICATION SYSTEM

(75) Inventors: Akinori Taira, Tokyo (JP); Fumio Ishizu, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 191 days.

(21) Appl. No.: 10/551,377

(22) PCT Filed: Mar. 18, 2004

(86) PCT No.: PCT/JP2004/003614

§ 371 (c)(1),
(2), (4) Date: Sep. 29, 2005

(87) PCT Pub. No.: WO2004/095730

PCT Pub. Date: Nov. 4, 2004

(65) Prior Publication Data

US 2006/0258303 A1    Nov. 16, 2006

(30) Foreign Application Priority Data

Apr. 21, 2003    (JP)    ............................. 2003-116172

(51) Int. Cl.
H04B 7/00    (2006.01)
H04B 7/216    (2006.01)
H04B 1/00    (2006.01)
H04B 7/10    (2006.01)
H04B 1/10    (2006.01)
H04B 1/02    (2006.01)
H04B 1/04    (2006.01)
H04B 7/08    (2006.01)
H04L 27/00    (2006.01)
H04L 1/02    (2006.01)

(52) U.S. Cl. .................. 370/310; 370/335; 370/343; 375/148; 375/299; 375/347; 375/349; 455/101; 455/103; 455/132

(58) Field of Classification Search .................. 370/310, 370/335, 343; 375/148, 299, 347, 349; 455/101, 455/103, 132
See application file for complete search history.

(56) References Cited

U.S. PATENT DOCUMENTS 6,377,631 B1 *   4/2002   Raleigh ..................... 375/299

(Continued)

FOREIGN PATENT DOCUMENTS

JP    2000-188585    7/2000
JP    2002-198878    7/2002

OTHER PUBLICATIONS

Sumaru Niida et al., "Adaptive Modulation using Space-Time Block Code Matrix", The Institute of Electronics, Information and Communication Engineers, Gijutsu Kenkyu Hokoku, vol. 101, No. 682, pp. 31 to 36, Feb. 27, 2002.

(Continued)

*Primary Examiner*—Lester Kincaid
*Assistant Examiner*—Nathan Mitchell
(74) *Attorney, Agent, or Firm*—Oblon, Spivak, McClelland, Maier & Neustadt, P.C.

(57) ABSTRACT

A radio communication apparatus at a transmission side that includes a plurality of transmission antennas and performs a communication using at least one carrier. The radio communication apparatus includes a channel dividing unit configured to divide a transmission signal into a plurality of channels based on channel structure information returned from another radio communication apparatus at a reception side and indicating a structure of a space-division-multiplexing-channel and a space-time-coding channel between transmission and reception antennas, and a space-time-coding unit configured to realize transmission diversity by performing a space-time-coding processing for each of the plurality of channels.

24 Claims, 5 Drawing Sheets

U.S. PATENT DOCUMENTS

| | | | | |
|---|---|---|---|---|
| 6,731,618 | B1* | 5/2004 | Chung et al. | 370/328 |
| 6,760,388 | B2* | 7/2004 | Ketchum et al. | 375/295 |
| 6,771,706 | B2* | 8/2004 | Ling et al. | 375/267 |
| 7,248,841 | B2* | 7/2007 | Agee et al. | 455/101 |
| 2003/0043887 | A1* | 3/2003 | Hudson | 375/144 |
| 2003/0185174 | A1* | 10/2003 | Currivan et al. | 370/335 |
| 2004/0121753 | A1* | 6/2004 | Sugar et al. | 455/333 |
| 2004/0240378 | A1* | 12/2004 | Kei Ng et al. | 370/206 |

OTHER PUBLICATIONS

Kei Ji et al., "MIMO Channel Transmission with Antenna Selection and Optimum Power Allocation", 2003 Nen The Institute of Electronics, Information and Communication Engineers, Sogo Taikai Koen Ronbunshu, p. 622, B-5-163, Mar. 3, 2003.

Yoshitaka Hara et al., "Weight Control Scheme for MIMO System with Multiple Transmit and Receiver Beamforming", The Institute of Electronics, Information and Communication Engineers, Gijutsu Kenkyu Hokoku, vol. 102, No. 282, pp. 33 to 40, RCS2002-152, Aug. 23, 2002.

Kazumi Miyashita et al., "Eigenbeam-Space Division Multiplexing (E-SDM) in a MIMO Channel", The Institute of Electronics, Information and Communication Engineers, Giyutsu Kenkyyu Hokoku, vol. 102, No. 86, pp. 13 to 18, RCS2002-53, May 17, 2002.

Satoshi Kurosaki et al., "100Mbit/s SDM-COFDM over MIMO Channel for Broadband Mobile Communications", The Institute of Electronics, Information and Communication Engineers, Technical Report of IEICE, pp. 37-42 A•P2001-135, Oct. 2001.

Siavash M. Alamouti: "A Simple Transmit Diversity Technique for Wireless Communications", IEEE Journal on Select Areas in Communications, vol. 16, No. 8, pp. 1451-1458, Oct. 1998.

Vahid Tarokh et al.: "Space-Time Block Coding for Wireless Communications: Performance Results", IEEE Journal on Selected Areas in Communications, vol. 17, No. 3, pp. 451-460, Mar. 1999.

Tetsushi Abe, et al., "A Hybrid MIMO System Using Spatial Correlation", IEEE, Oct. 27-30, 2002, pp. 1346-1350.

Stephanie Rouquette-Leveil, et al., "Spatial Division Multiplexing of Space-Time Block Codes", Proceedings of ICCT 2003, vol. 2, 2003, pp. 1343-1347.

Dhananjay A. Gore, et al., "MIMO Antenna Subset Selection With Space-Time Coding", IEEE Transactions on Signal Processing, vol. 50, No. 10, Oct. 2002, pp. 2580-2588.

Giuseppe Abreu, et al., "Beamwidth-Adjustable Low Sidelobe Beamforming for Space-Time Diversity", IEEE 7$^{TH}$ International Symposium on Spread-Spectrum Tech & Appl., Sep. 2-5, 2002, pp. 526-530.

* cited by examiner

RADIO COMMUNICATION APPARATUS, TRANSMITTER APPARATUS, RECEIVER APPARATUS AND RADIO COMMUNICATION SYSTEM

TECHNICAL FIELD

The present invention relates to a radio communication apparatus that employs a multicarrier modulation/demodulation method as a communication method, and more particularly relates to a radio communication apparatus that can be applied to a system that utilizes a space-division-multiplexing (SDM) method and a transmit diversity technique.

BACKGROUND ART

In conventional communication apparatuses, when wide band signals are transmitted and received in a mobile environment, frequency selective fading must be overcome. A multicarrier, in particular, orthogonal frequency division multiplexing (OFDM) is employed in various types of radio systems as a countermeasure technique for the frequency selective fading. On the other hand, attention is focused on multiple-input-multiple-output (MIMO) systems, which simultaneously transfer two or more signals by using multiple antennas, in order to further increase transmit capacity. MIMO systems are broadly classified into methods according to SDM and methods according to transmit diversity. A transmit diversity technique called space time coding (STC) belongs to the latter method.

An example of the SDM method is explained briefly (see "Proposal for SDM-COFDM for Wide Band Mobile Communication Realizing 100 Mbit/s by MIMO Channels". Technical Report RCS2001-135 of The Institute of Electronics, Information and Communication Engineers). In a communication apparatus at a transmitter side, error correction coding is carried out individually on data of two channels that are transmitted simultaneously, and thereafter, a predetermined modulation processing is carried out on the respective data after coding, and the results thereof are placed at corresponding subcarriers. The signals on the respective subcarriers are then individually converted into time domain (OFDM signals) by inverse Fast Fourier Transform (IFFT) processing, guard intervals are added, the signals are upconverted to a high frequency band, and thereafter, are transmitted by corresponding transmit antennas.

In the communication apparatus at the receiver side, first, high frequency signals received at different reception antennas are individually converted into baseband signals. At this time, since multiple signals (the two channels) are mixed in each baseband signal, these signals must be separated. Each baseband signal is then converted into a frequency domain signal by Fast Fourier Transform (FFT) processing. Namely, the baseband signals become signals of subcarrier units (subcarrier signals). Since signals of plural channels are multiplexed, these subcarrier signals are extracted as reception signals of respective channels by weight control. "Proposal for SDM-COFDM for Wide Band Mobile Communication Realizing 100 Mbit/s by MIMO Channels", Technical Report RCS2001-135 of The Institute of Electronics, Information and Communication Engineers, Zero-Forcing, which completely suppresses non-desired channels, is used in computing the weight. The reception signals, which are separated into channel units, are respectively subjected to metric computation by demodulation processing, and to error correction processing, and thereafter, are output as final reception signals of respective channels.

In this way, in a conventional communication apparatus that employs the SDM method, the number of transmission symbols per unit time can be increased by simultaneously transmitting different signal series by using plural channels. Namely, high-speed communication in a good channel condition can be realized.

On the other hand, in a communication apparatus that employs the STC method, generally, inverse matrix computation is not needed in channel separation at the reception side, and therefore, reception processing can be realized by a small amount of computation. Further, an apparatus configuration at the reception side can be realized by one antenna, and excellent communication quality can be ensured even in a low S/N environment. Theoretical signal processing of the STC method is disclosed in detail in S. M. Alamouti. "A Simple Transmit Diversity Technique for Wireless communications", IEEE J. Selected Areas in Communications, vol. 16, pp. 1451-1458, Oct. 1998, and V. Tarokh, H. Jafarkhani, A. R. Calderbank, "Space-time Block Coding for Wireless Communications: Performance Results", IEEE Journal On Selected Areas in Communications, Vol. 17, pp. 451-460, No. 3, March 1999.

However, in the conventional communication apparatus that employs the SDM method, since inverse matrix computation is needed for channel separation, the amount of computation increases. Further, for example, when an inverse matrix does not exist in the inverse matrix computation (or the matrix Eq. is near 0), a sudden deterioration in the signal-to-noise ratio (S/N) arises. Reception antennas in a number that is greater than or equal to the number of simultaneous transmission channels are needed.

In the conventional communication apparatus that employs the STC method, since the same signal is transmitted for plural times, it is difficult to increase the number of transmission symbols.

The communication apparatus that employs the STC method and the communication apparatus that employs the SDM method have mutually opposing features as described above. In other words, they have inherent problems. Therefore, there are more to be improved in structuring optimal MIMO channels.

The present invention has been achieved in order to solve the above problems, and it is an object of the present invention to provide a radio communication apparatus that can structure optimal MIMO channels by realizing the features of both methods and by realizing even higher speed.

DISCLOSURE OF THE INVENTION

A radio communication apparatus according to one aspect of the present invention, which performs a communication using at least one carrier, includes a plurality of transmission antennas; a transmission-processing unit (a configuration shown in FIG. 2) that includes a channel dividing unit that divides a transmission signal into a plurality of channels based on channel structure information indicating a method of structuring a multiple-input-multiple-output channel informed from a communication apparatus at a reception side, and a space-time-coding unit that realizes transmission diversity by performing a space-time-coding processing for each of the channels divided; and a reception-processing unit (a configuration shown in FIG. 3) that includes a channel estimating unit that estimates a channel information for transmission and reception, and a channel-structure determining unit that determines a structure of a multiple-input-multiple-output channel based on a result of a channel estimation, a physical configuration of a communication apparatus at a transmission side, and a physical configuration of the radio communication apparatus itself, and informs channel structure information that is a result of a determination to the communication apparatus at the transmission side.

According to the present invention, an optimal MIMO channel structure (channel division by antennas, channel division by STC) is determined from various parameters such as the numbers of antennas provided at a transmitter and a receiver, computational capacity, and channel state. Efficient communication can thereby be carried out as compared with the conventional technique. Further, even in a communication environment in which an inverse matrix does not exist in a conventional SDM method, there is a high possibility that an equalization matrix can be generated by applying STC. Therefore, excellent communication quality, which is the feature of STC, can be realized while maintaining high-speed communication, which is the feature of SDM.

BEST MODE FOR CARRYING OUT THE INVENTION

Exemplary embodiments of a radio communication apparatus, a transmitter, a receiver, and a radio communication system according to the present invention will be explained in detail below with reference to the accompanying drawings. The invention is not limited by the embodiments.

Processing executed by a radio communication apparatus according to the present invention will be explained theoretically. In the explanation, the number of subcarriers is 1.

Given that a channel gain from a transmission antenna i to a reception antenna k is expressed as $h_{ik}$, when there are two transmission antennas for example, an SDM method can be expressed by following Eq. (1). $r_j$ represents a reception signal at a reception antenna j, and $x_j$ represents a transmission signal at a transmission antenna j (equivalent to channel j). Noise is ignored herein.

$$\begin{bmatrix} r_1 \\ r_2 \end{bmatrix} = \begin{bmatrix} h_{11} & h_{21} \\ h_{12} & h_{22} \end{bmatrix} \begin{bmatrix} x_1 \\ x_2 \end{bmatrix} \quad (1)$$

When the STC method also uses a specific signal arrangement matrix, description similar to Eq. (1) is possible. For example, when a matrix of two transmission antennas and Rate=1 is used, given that a reception signal at time n is $y_n$, it can be expressed as per following Eq. (2).

$$\begin{bmatrix} y_1 \\ y_2 \end{bmatrix} = \begin{bmatrix} h_{11} & h_{21} \\ h_{21}^* & -h_{11}^* \end{bmatrix} \begin{bmatrix} x_1 \\ x_2 \end{bmatrix} \quad (2)$$

The difference from the SDM method is that, since there is one reception antenna, the channel gain is only expressed as two types of values (assuming that there are no fluctuations in the transmission environment within the block of STC). As can be understood from above Eqs. (1) and (2), SDM and STC can be expressed in exactly the same form.

Figure 1:
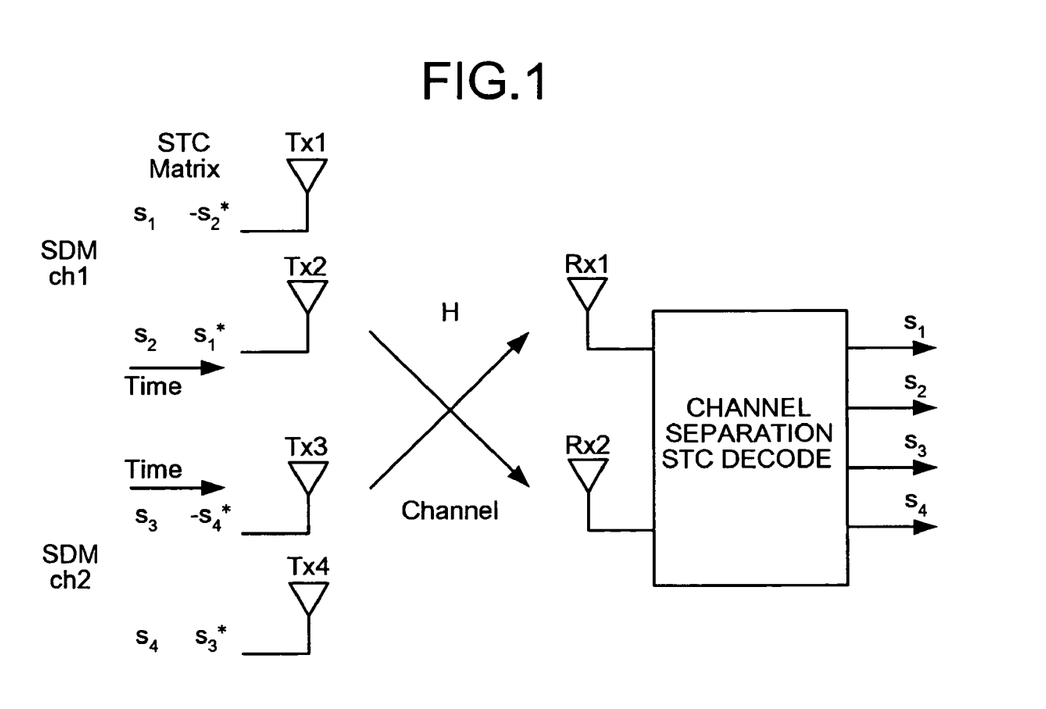
FIG. 1 depicts a system model of the present invention.

FIG. 1 depicts a system model of the present embodiment when the SDM method and the STC method are used simultaneously. STC processing of two channels at four transmission antennas and two reception antennas is assumed. Transmission antennas Tx1 and Tx2 are considered as one SDM channel (corresponding to one transmission antenna in conventional SDM: expressed as SDMch1), and transmit signals after STC processing. SDMch2, which is structured by transmission antennas Tx3 and Tx4, also transmits signals after STC processing. In this case, four symbols of transmission signals $s_1$, $s_2$, $s_3$ and $s_4$ are transmitted in two unit-time periods.

Given that a signal at time t of the reception antenna n is expressed as $r_{n,t}$, a reception signal can be described in a form that completely combines SDM and STC as per following Eq. (3), by above Eqs. (1) and (2).

$$\begin{bmatrix} r_{1,1} \\ r_{1,2} \\ r_{2,1} \\ r_{2,2} \end{bmatrix} = \begin{bmatrix} h_{11} & h_{21} & h_{31} & h_{41} \\ h_{21}^* & -h_{11}^* & h_{41}^* & -h_{31}^* \\ h_{12} & h_{22} & h_{32} & h_{42} \\ h_{22}^* & -h_{12}^* & h_{42}^* & -h_{32}^* \end{bmatrix} \begin{bmatrix} s_1 \\ s_2 \\ s_3 \\ s_4 \end{bmatrix} \quad (3)$$

When above Eq. (3) is generalized, it can be expressed as per following Eq. (4).

$$R = G \cdot S \quad (4)$$

When an inverse matrix exists at above G, separation of four channels combining SDM and STC is possible.

When signal arrangement matrices expressing STC are A(SDMch1) and B(SDMch2), and following Eqs. (5) according to the above example is applied (subscripts of A and B are reception antenna numbers), matrix G is as per following Eq. (6).

$$A_1 = \begin{bmatrix} h_{11} & h_{21} \\ h_{21}^* & -h_{11}^* \end{bmatrix} \quad B_1 = \begin{bmatrix} h_{31} & h_{41} \\ h_{41}^* & -h_{31}^* \end{bmatrix} \quad (5)$$

$$G = \begin{bmatrix} A_1 & B_1 \\ A_2 & B_2 \end{bmatrix} \quad (6)$$

In order to regularize the matrix G, it suffices for each row and column of G to not be parallel. Accordingly, even when compared with a usual SDM method of two antennas for transmission and reception, it is highly possible that an inverse matrix exists, and therefore, a range of application of MIMO can be broadened.

Figure 2:
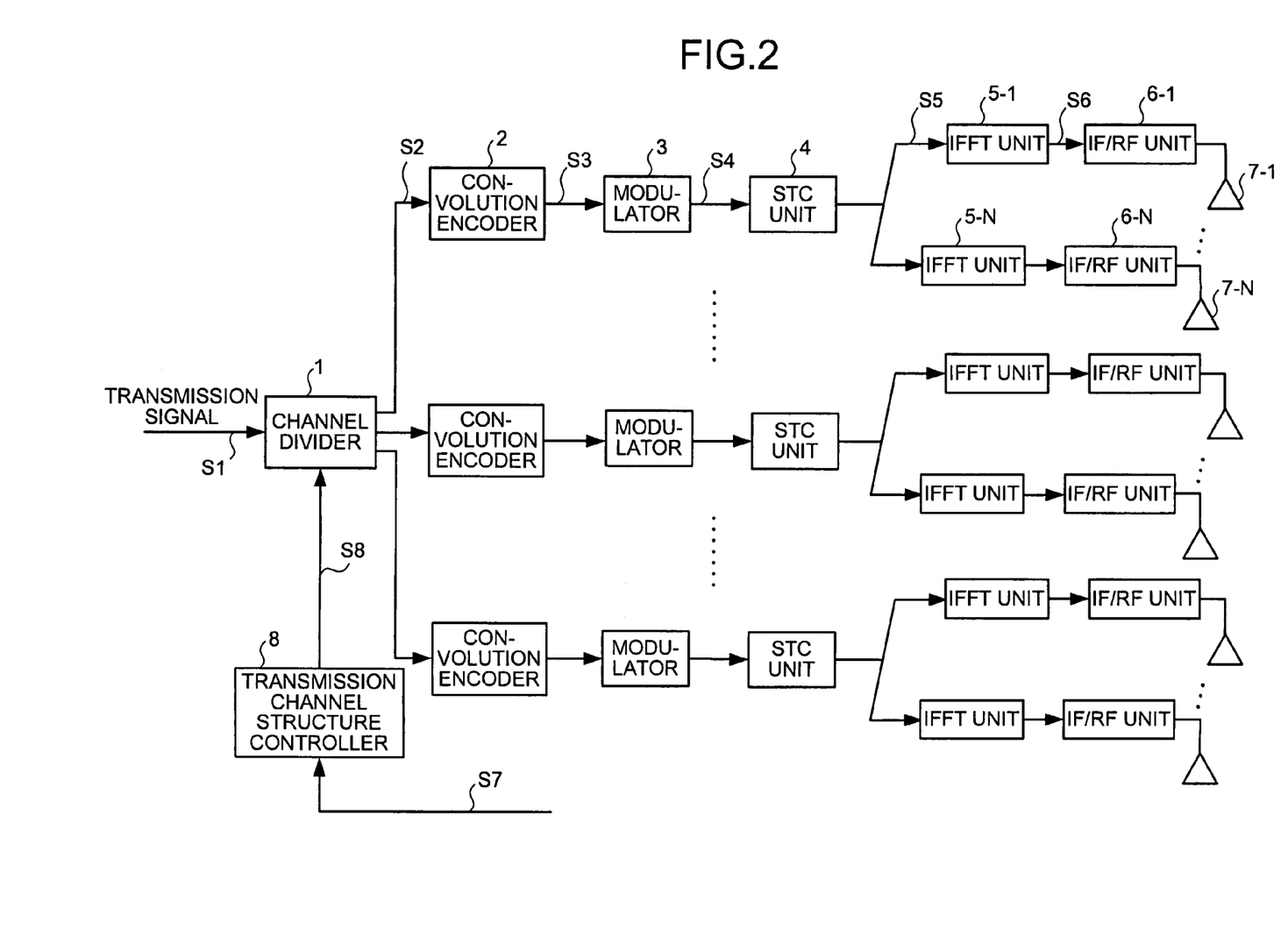
FIG. 2 is a configuration diagram of a transmitter according to a first embodiment of the present invention.

Operation of a communication apparatus at a transmission side (hereinafter, "transmitter") and a communication apparatus at a reception side (hereinafter, "receiver") that realize the above theory is concretely explained with reference to the drawings. FIG. 2 is a configuration diagram of the transmitter according to the first embodiment of the present invention, and FIG. 3 is a configuration diagram of the receiver according to the first embodiment.

The transmitter shown in FIG. 2 has a channel dividing unit 1 that divides a transmission signal S1 into plural channels based on channel structure control information S8, described later, convolution encoders 2 that execute error correction coding processing on transmission signals S2 of respective channels after division, modulators 3 that execute a predetermined modulation processing on coded data S3, STC units 4 that assign transmission times and antennas to modulated signals S4, IFFT units 5-1 through 5-N (N is an integer of 2 or more) that convert transmission signals S5 on subcarriers assigned to respective antennas, into signals on a time axis (baseband signals S6), IF/RF units 6-1 through 6-N that convert the baseband signals S6 into a high frequency band, transmission antennas 7-1 through 7-N, and a transmission channel structure controller 8 that generates the channel structure control information S8 from channel structure information S7 that is fed-back from a receiver side, described later. For convenience of explanation, operation at a specific channel is described herein, but operation is similar for other channels as well.

Figure 3:
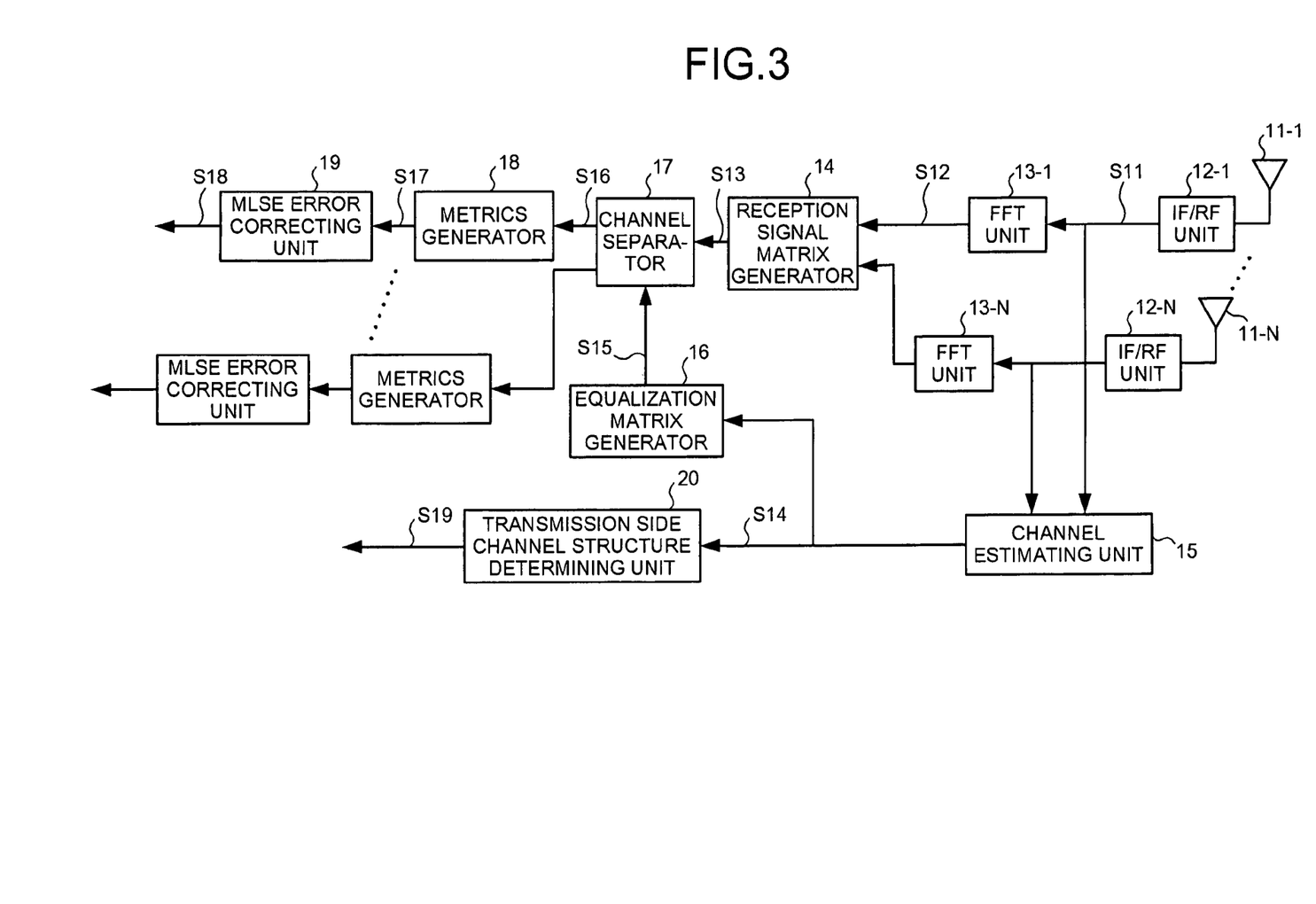
FIG. 3 is a configuration diagram of a receiver according to the first embodiment.

The receiver shown in FIG. 3 has reception antennas 11-1 through 11-N (it may be one antenna), IF/RF units 12-1 through 12-N that convert high frequency signals into baseband signals S11, FFT units 13-1 through 13-N that convert the baseband signals S11 into signals on a frequency domain (frequency signals S12), a reception signal matrix generator 14 that generates a reception signal matrix S13 (corresponding to R of Eq. (4)) according to channel structure information (information indicating how the SDM channel and the STC channel are structured between transmission and reception antennas), a channel estimating unit 15 that carries out channel estimation by utilizing a known pattern in the reception signals (the baseband signals S11), an equalization matrix generator 16 that generates an equalization matrix S15 (corresponding to the inverse matrix of G of Eq. (4)) according to channel information S14 and a channel structure, a channel separator 17 that computes a transmission signal estimate value S16 on each subcarrier from the reception signal matrix S13 and the equalization matrix S15, metrics generators 18 that generate metrics information S17 for error correction based on the transmission signal estimate values S16, MLSE (Maximum Likelihood Sequence Estimation) error correcting units 19 that obtain output signals S18 by applying error correction to the metrics information S17, and a transmission side channel-structure determining unit 20 that generates channel structure information S19 of the transmitter side from the channel information S14, the number of reception antennas, its own computational ability, and the like. Although operation at a specific channel is described herein for convenience of explanation, operation is similar at other channels as well.

Operation of the transmitter and the receiver is described in detail below. The transmitter receives the channel structure information S7, which indicates how the MIMO channel is structured and how it should be transmitted, from the receiver side. The transmission channel structure controller 8 generates the channel structure control information S8 from the channel structure information S7.

The channel dividing unit 1 divides the transmission signal S1 from a user into plural channels according to an instruction of the channel structure control information S8. For example, when the transmission signal S1 is divided into two channels according to SDM and two channels according to STC, the transmission signal S1 is divided into two channels for SDM, and STC processing is further applied to the transmission signals after division. Specifically, the convolution encoders 2 execute error correction convolution coding processing on the transmission signals S2 after channel division, and the modulators 3 modulate the coded data S3, and then the STC units 4 assign times for transmission and transmission antennas to the modulated signals S4, and distribute them to the respective transmission antennas.

At the IFFT units 5-1 through 5-N, the distributed transmission signals S5 are placed on the subcarriers, and are converted into signals on a time domain (the baseband signals S6). Then, the IF/RF units 6-1 through 6-N upconvert the baseband signals S6 to a high frequency band and transmit them. In actual practice, processings such as known signal addition for channel estimation are also carried out, but explanation thereof is omitted for simplicity. For other channels, transmission processing is carried out by similar procedures as those described above.

At the receiver, after reception of the high frequency signals at the antennas 11-1 through 11-N, the IF/RF units 12-1 through 12-N generate the baseband signals S11. The channel estimating unit 15 estimates the channel between the respective transmission and reception antennas by using a known pattern contained in the baseband signals S11. The equalization matrix generator 16 computes equalization matrices $G^{-1}$ for channel separation (signal arrangement matrices determined from STC signal arrangement matrices: an equalization matrix for each channel).

The FFT units 13-1 through 13-N convert the user data in the baseband signals S11 into the frequency signals S12, and they are taken-out as signals on the respective subcarriers. The reception signal matrix generator 14 generates the reception signal matrix S13 (R of Eq. (3)) from the frequency signals S12 based on a designated MIMO channel structure. Then, the transmission signal estimate values S16 are computed at the channel separator 17 from the reception signal matrix S13 and the equalization matrix S15.

The metrics generator 18 computes metrics information S17 for error correction from the transmission signal estimate values S16. Then, the MLSE error correcting units 19 execute error correction processing, and the final output signals S18 are obtained.

In the present embodiment, the MIMO channel structure must be designated from the receiver side to the transmitter side. Thus, the transmission side channel-structure determining unit 20 determines the structure of the MIMO channel by using various parameters, specifically, by using the channel information S14 (the S/N of the reception signal, or the like), the numbers of antennas of, the computational capacities of, and the like of the transmitter and the receiver. Then, the transmission side channel-structure determining unit 20 feeds-back the channel structure information S19, which is the results of the determination, to the transmitter as the channel structure information S7. Various patterns exist as the method of determining the channel structure. For example, when the computational capacity of the receiver is markedly low, even if the state of the transmission path is good, the STC channel, at which channel separation is easy, is prioritarily selected. Conversely, when both the transmitter and the receiver have sufficient numbers of antennas and computational capacities and the channel state is suited to MIMO (when the correlation between the antennas is small), the SDM structure, which has a large number of simultaneous transmission channels, is selected.

In this way, in the present embodiment, the optimal MIMO channel structure (channel division by antennas, channel division by STC) is determined from various parameters such as the number of antennas provided at each apparatus, the computational capacity, and the channel state, thereby performing efficient communication. Further, even in a communication environment in which an inverse matrix does not exist in the conventional SDM method, there is a high possibility that an equalization matrix can be generated by applying STC. Therefore, excellent communication quality, which is the feature of STC, can be realized while maintaining high-speed communication, which is the feature of SDM.

Figure 4:
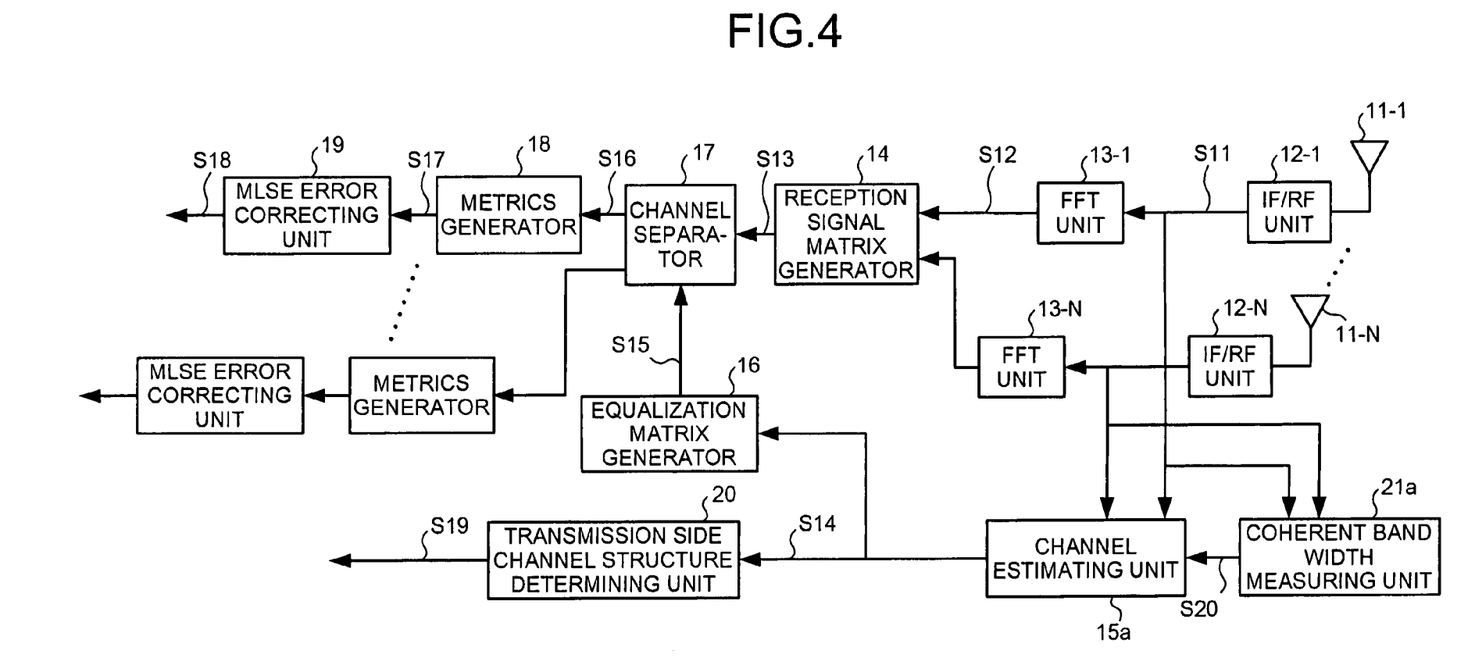
FIG. 4 is a configuration diagram of a receiver according to a second embodiment of the present invention.

FIG. 4 is a configuration diagram of a receiver according to a second embodiment of the present invention. This receiver has a coherent-band width measuring unit 21a that measures a coherent band width of the channel, and a channel estimating unit 15a that carries out channel estimation by using coherent band width information S20 and a known pattern in the reception signal. Like reference signs designate like parts as those according to the first embodiment, and description thereof is omitted. Only operation that differs from the first embodiment is described herein.

The coherent-band width measuring unit 21a periodically observes the baseband signals S11, and computes a coherent band width at the current channel (a frequency width at which the channel gain is considered to be substantially constant). Usually for example, a pilot signal portion is used because a known signal is needed for this computation. Since it is considered to be a substantially constant channel gain within the coherent band width, the channel estimating unit 15a performs channel estimation processing for one subcarrier within the band width expressed by the coherent band width information S20 (Information expressing the frequency band having substantially the same channel gain at a momentary transmission path. For example, information that the coherent band is 1 megahertz when fluctuations of the channel can be ignored at a width of 1 megahertz within a signal band of 100 megahertz.). Namely, the signal band is divided into several subcarrier groups having the same channel information, by the coherent band information S20. Then, channel estimation processing and equalization matrix generation processing are carried out one time within the group, and the same equalization matrix is used at all of the subcarriers within the group.

The channel estimating unit 15a is not limited to the one described above, and, for example, channel estimation may be carried out for plural subcarriers within the subcarrier group, and the results thereof may be averaged.

In this way, in the present embodiment, the channel estimation processing and the equalization matrix generation processing are carried out only one time for each subcarrier group within the coherent band. Thus, in addition to similar effects as the first embodiment, the amount of computation can be greatly reduced, and the apparatus configuration can be simplified.

Figure 5:
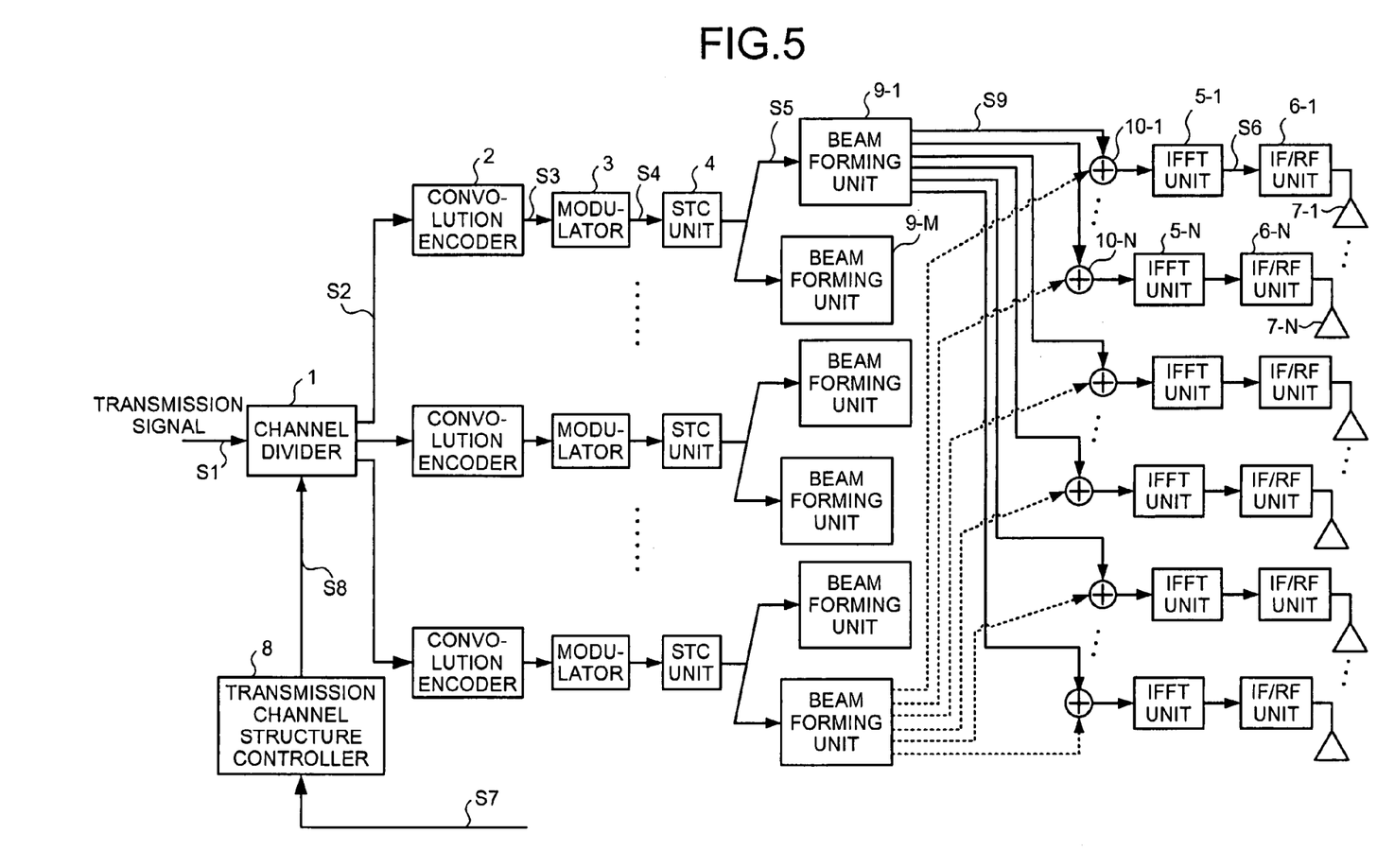
FIG. 5 is a configuration diagram of a transmitter according to a third embodiment of the present invention.

FIG. 5 is a configuration diagram of a transmitter according to a third embodiment of the present invention. This transmitter has beam forming units 9-1 through 9-M (an integer of 2 or more) that carry out complex multiplication in transmission antenna units on data of the respective transmission channels and control transmitting directions, and adding units 10-1 through 10-N that add all of the transmission signals after beam forming control corresponding to the respective transmission antennas. Like reference signs designate like parts as those according to the first embodiment, and description thereof is omitted. Only operation that differs from the first embodiment is described herein.

According to the first embodiment, the transmission signals S5 after STC processing are transmitted omnidirectionally from the respective transmission antennas. On the other hand, in the present embodiment, beam forming by plural antennas is applied to the transmission signals S5. In the present embodiment, the number of transmission channels after STC processing and the number of transmission antennas may not be equal.

Specifically, the beam forming units 9-1 through 9-M carry out individual direction control with respect to each transmission channel, and distribute them into transmission antenna units. The transmission signals S9 after direction control are added in the antenna units by the adding units 10-1 through 10-N, and after IFFT processing is executed by the IFFT units 5-1 through 5-N, the transmission signals S9 are upconverted to a high frequency band and transmitted. Although for convenience of explanation, outputs from some of the beam forming units are not added in FIG. 5, in actual practice, the outputs from all the beam forming units are added. It is disclosed in, for example, "Eigenbeam-Space-Division-Multiplexing (E-SDM) Method in MIMO Channels", which is Technical Report RCS2002-53 of The Institute of Electronics, Information and Communication Engineers, that optimal beam forming refers to a state that "SDM channels that are transmitted simultaneously are channels orthogonal to one another". The beam forming units control the weights of the respective antennas so as to form orthogonal channels between the transmitter and the receiver. Information of the channel information is needed for the computation of the weights, and this information is informed from the receiver side by a feedback line.

In this way, in the present embodiment, transmission electric power is concentrated by beam forming. Thus, even more efficient communication is possible. Further, since the number of transmission channels and the number of transmission antennas need not be equal, there are more degrees of freedom in channel selection, and therefore, an even better communication characteristic can be ensured.

INDUSTRIAL APPLICABILITY

As described above, the radio communication apparatus according to the present invention is useful as a technique for employing a multicarrier modulation/demodulation method as a communication method, and in particular, is suitable as a radio communication apparatus applicable to systems utilizing the SDM method and the transmission diversity technique.

The invention claimed is:

1. A radio communication apparatus at a transmission side that includes a plurality of transmission antennas and performs a communication using at least one carrier, the radio communication apparatus comprising:
    a channel dividing unit configured to divide a transmission signal into a plurality of channels based on channel structure information returned from another radio communication apparatus at a reception side and indicating a structure of a space-division-multiplexing channel and a space-time-coding channel between transmission and reception antennas; and
    a space-time-coding unit configured to realize transmission diversity by performing a space-time-coding processing for each of the plurality of channels.

2. The radio communication apparatus according to claim 1, further comprising:
    a beam forming unit configured to perform an individual direction control by a complex multiplication with respect to each of the plurality of channels to which the space-time-coding processing is performed, and to distribute the plurality of channels to the plurality of transmission antennas; and
    an adding unit configured to add all of the transmission signals to which the direction control is performed corresponding to each of the plurality of transmission antennas.

3. A radio communication apparatus at a reception side that includes at least one reception antenna and performs a communication using at least one carrier, the radio communication apparatus comprising:
- a channel estimating unit configured to estimate a channel gain between a transmission side and the reception side; and
- a channel-structure determining unit configured to determine a structure of a multiple-input-multiple-output channel based on a result of the estimation of the channel gain, a physical configuration of an other radio communication apparatus at the transmission side, and a physical configuration of the radio communication apparatus and to return channel structure information indicating a structure of a space-division-multiplexing channel and a space-time-coding channel between transmission and reception antennas that is a result of the determination to the other radio communication apparatus at the transmission side.

4. The radio communication apparatus according to claim 3, wherein the channel-structure determining unit is further configured to generate the channel structure information based on at least one of the result of the estimation of the channel gain, a number of antennas of the other radio communication apparatus at the transmission side and of the radio communication apparatus, and a computational capability of the other radio communication apparatus at the transmission side and of the radio communication apparatus.

5. The radio communication apparatus according to claim 4, further comprising a coherent bandwidth measuring unit configured to measure a coherent bandwidth at a channel by observing a reception signal, wherein
the channel estimating unit is further configured to divide a signal band into a plurality of subcarrier groups having the same channel information based on a result of measurement of the coherent bandwidth, and to perform the estimation of the channel gain per subcarrier group.

6. The radio communication apparatus according to claim 5, wherein the channel estimating unit is further configured to perform the estimation of the channel gain for a plurality of subcarriers within each subcarrier group, and to average results of the estimation of the channel gain for the plurality of subcarriers.

7. A radio communication apparatus that includes a plurality of transmission antennas and at least one reception antenna, and performs a communication using at least one carrier, the radio communication apparatus comprising:
- a transmission-processing unit including:
  - a channel dividing unit configured to divide a transmission signal into a plurality of channels based on channel structure information returned from a first radio communication apparatus at a reception side and indicating a structure of a space-division-multiplexing channel and a space-time-coding channel between transmission and reception antennas, and
  - a space-time-coding unit configured to realize transmission diversity by performing a space-time-coding processing for each of the plurality of channels; and
- a reception-processing unit including:
  - a channel estimating unit configured to estimate a channel gain between a transmission side and a reception side, and
  - a channel-structure determining unit configured to determine a structure of a multiple-input-multiple-output channel based on a result of the estimation of the channel gain, a physical configuration of a second radio communication apparatus at the transmission side, and a physical configuration of the first radio communication apparatus at the reception side, and to return channel structure information that is a result of the determination to the second radio communication apparatus at the transmission side.

8. The radio communication apparatus according to claim 7, wherein the channel-structure determining unit is further configured to generate the channel structure information based on at least one of the result of the estimation of the channel gain, a number of antennas of the second radio communication apparatus at the transmission side and of the first radio communication apparatus at the reception side, and a computational capability of the second radio communication apparatus at the transmission side and the first radio communication apparatus at the reception side.

9. The radio communication apparatus according to claim 8, wherein
the reception-processing unit further includes a coherent bandwidth measuring unit configured to measure a coherent bandwidth at a channel by observing a reception signal, wherein
the channel estimating unit is further configured to divide a signal band into a plurality of subcarrier groups having the same channel information based on a result of measurement of the coherent bandwidth, and to perform the estimation of the channel gain per subcarrier group.

10. The radio communication apparatus according to claim 9, wherein the channel estimating unit is further configured to perform the estimation of the channel gain for a plurality of subcarriers within each subcarrier group, and to average results of the estimation of the channel gain for the plurality of subcarriers.

11. A transmitter that includes a plurality of transmission antennas and transmits a transmission signal to a receiver using at least one carrier, the transmitter comprising:
- a channel dividing unit configured to divide a transmission signal into a plurality of channels based on channel structure information returned from the receiver and indicating a structure of a space-division-multiplexing channel and a space-time-coding channel between transmission and reception antennas; and
- a space-time-coding unit configured to realize transmission diversity by performing a space-time-coding processing for each of the plurality of channels.

12. The transmitter according to claim 11, further comprising:
- a beam forming unit configured to perform an individual direction control by a complex multiplication with respect to each of the plurality of channels to which the space-time-coding processing is performed, and to distribute the plurality of channels to the plurality of transmission antennas; and
- an adding unit configured to add all of the transmission signals to which the direction control is performed corresponding to each of the plurality of transmission antennas.

13. A receiver that includes at least one reception antenna and receives a signal from a transmitter using at least one carrier, the receiver comprising:
- a channel estimating unit configured to estimate a channel gain between a transmission side and a reception side; and
- a channel-structure determining unit configured to determine a structure of a multiple-input-multiple-output channel based on a result of the estimation of the channel gain, a physical configuration of the transmitter, and a physical configuration of the receiver, and to return channel structure information indicating a structure of a space-division-multiplexing channel and a space-time-coding channel between transmission and reception antennas that is a result of the determination to the transmitter.

14. The receiver according to claim 13, wherein the channel-structure determining unit is further configured to generate the channel structure information based on at least one of the result of the estimation of the channel gain, a number of antennas of the transmitter and of the receiver, and a computational capability of the transmitter and of the receiver.

15. The receiver according to claim 14, further comprising a coherent bandwidth measuring unit configured to measure a coherent bandwidth at a channel by observing a reception signal, wherein
the channel estimating unit is further configured to divide a signal band into a plurality of subcarrier groups having the same channel information based on a result of measurement of the coherent bandwidth, and to perform the estimation of the channel gain per subcarrier group.

16. The receiver according to claim 15, wherein the channel estimating unit is further configured to perform the estimation of the channel gain for a plurality of subcarriers within each subcarrier group, and to average results of the estimation of the channel gain for the plurality of subcarriers.

17. A radio communication system comprising:
a transmitter configured to transmit a transmission signal to a receiver using at least one carrier, the transmitter including:
a plurality of transmission antennas,
a channel dividing unit configured to divide a transmission signal into a plurality of channels based on channel structure information returned from the receiver and indicating a structure of a space-division-multiplexing channel and a space-time-coding channel between transmission and reception antennas, and
a space-time-coding unit configured to realize transmission diversity by performing a space-time-coding processing for each of the plurality of channels; and
a receiver configured to receive the transmission signal from the transmitter using at least one carrier, including
at least one reception antenna,
a channel estimating unit configured to estimate a channel gain between a transmission side and a reception side, and
a channel-structure determining unit configured to determine a structure of a multiple-input-multiple-output channel based on a result of the estimation of the channel gain, a physical configuration of the transmitter, and a physical configuration of the receiver, and to return channel structure information that is a result of the determination to the transmitter.

18. The radio communication system according to claim 17, wherein the channel-structure determining unit is further configured to generate the channel structure information based on at least one of the result of the estimation of the channel gain, a number of antennas of the transmitter and of the receiver, and a computational capability of the transmitter and of the receiver.

19. The radio communication system according to claim 18, wherein
the receiver further includes a coherent bandwidth measuring unit configured to measure a coherent bandwidth at a channel by observing a reception signal, wherein
the channel estimating unit is further configured to divide a signal band into a plurality of subcarrier groups having the same channel information based on a result of measurement of the coherent bandwidth, and to perform the estimation of the channel gain per subcarrier group.

20. The radio communication system according to claim 19, wherein the channel estimating unit is further configured to perform the estimation of the channel gain for a plurality of subcarriers within each subcarrier group, and to average results of the estimation of the channel gain for the plurality of subcarriers.

21. The radio communication apparatus according to claim 1, wherein the radio communication apparatus is configured to simultaneously use the space-division-multiplexing channel and the space-time-coding channel in the communication.

22. The radio communication apparatus according to claim 7, wherein the transmission-processing unit is configured to simultaneously use the space-division-multiplexing channel and the space-time-coding channel in the communication.

23. The transmitter according to claim 11, wherein the transmitter is configured to simultaneously use the space-division-multiplexing channel and the space-time-coding channel.

24. The radio communication system of claim 17, wherein the transmitter is further configured to simultaneously use the space-division-multiplexing channel and the space-time-coding channel.

* * * * *